US009989783B1

(12) United States Patent
Pierce

(10) Patent No.: US 9,989,783 B1
(45) Date of Patent: Jun. 5, 2018

(54) ACCESSORY FOR EYEWEAR

(71) Applicant: Jessica Pierce, Severna Park, MD (US)

(72) Inventor: Jessica Pierce, Severna Park, MD (US)

(*) Notice: Subject to any disclaimer, the term of this patent is extended or adjusted under 35 U.S.C. 154(b) by 0 days. days.

(21) Appl. No.: 15/476,020

(22) Filed: Mar. 31, 2017

(51) Int. Cl.
G02C 11/00 (2006.01)
G02C 11/02 (2006.01)

(52) U.S. Cl.
CPC ............. G02C 11/02 (2013.01); G02C 11/00 (2013.01)

(58) Field of Classification Search
CPC ................................ G02C 11/00; G02C 11/02
USPC ..................................................... 351/51, 52
See application file for complete search history.

(56) References Cited

U.S. PATENT DOCUMENTS

| 1,834,415 | A | * | 12/1931 | O'Meara | A61F 9/045 2/13 |
| 2,504,524 | A | | 8/1946 | Hayward | |
| 2,580,744 | A | * | 1/1952 | Edsall | G02C 7/16 2/13 |
| 2,795,793 | A | * | 6/1957 | Sommers | G02C 7/10 2/13 |
| 3,237,204 | A | * | 3/1966 | Honsaker | A61F 9/045 2/13 |
| 4,582,401 | A | * | 4/1986 | Grindle | G02C 7/16 351/158 |
| 4,606,453 | A | | 8/1986 | Burns | |
| 4,974,953 | A | * | 12/1990 | Von Braunhut | A63H 33/22 351/45 |
| 5,032,019 | A | | 7/1991 | Burchett | |
| 5,712,697 | A | | 1/1998 | Walton | |
| 5,764,338 | A | | 6/1998 | Mack | |
| 5,775,018 | A | * | 7/1998 | Steinborn | G02C 11/02 40/299.01 |
| D466,610 | S | * | 12/2002 | Ashton | D24/189 |
| 7,093,303 | B2 | | 8/2006 | Thorson | |
| 7,488,068 | B2 | | 2/2009 | Welchel et al. | |
| 7,727,138 | B2 | * | 6/2010 | Alvarado | G02C 5/001 351/158 |
| 8,387,163 | B2 | | 3/2013 | Beliveau | |
| 9,519,159 | B1 | * | 12/2016 | King | G02C 7/16 |
| 2003/0014800 | A1 | | 1/2003 | Meyers | |
| 2006/0187404 | A1 | | 8/2006 | Ifergan | |
| 2008/0117381 | A1 | * | 5/2008 | Chen | G02C 11/02 351/52 |
| 2011/0283445 | A1 | * | 11/2011 | Stiff | A63B 33/002 2/442 |

(Continued)

FOREIGN PATENT DOCUMENTS

WO 2007125436 A1 11/2007

Primary Examiner — William R Alexander
(74) Attorney, Agent, or Firm — Laubscher, Spendlove & Laubscher, P.C.

(57) ABSTRACT

An accessory for eyewear including a sheet of lightweight, flexible material, the accessory having an interior facing surface and an exterior facing surface, a first front portion, a second back portion, a first side portion and a second side portion. The accessory includes at least one aperture positioned in spaced relation between the first and second portions and the first and second side portions and intersecting the sheet along a longitudinal axis. A releasable complementary fastening system is included, whereby when the sheet is folded along the sheet axis an eyewear lens portion passes through the aperture and the eyewear is secured within the fold by the fastening system.

20 Claims, 15 Drawing Sheets

(56) References Cited

U.S. PATENT DOCUMENTS

2013/0329180 A1* 12/2013 Johnson ................ G02C 11/02
    351/52
2014/0138264 A1  5/2014 Rouzeau

* cited by examiner

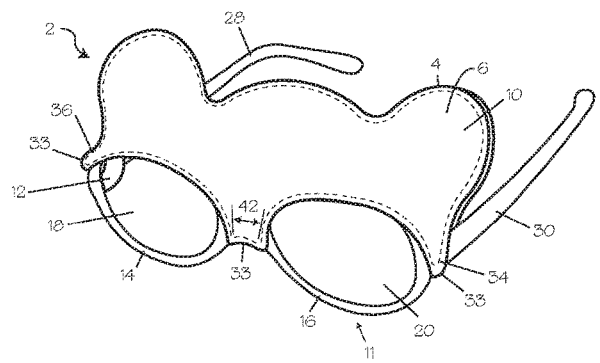
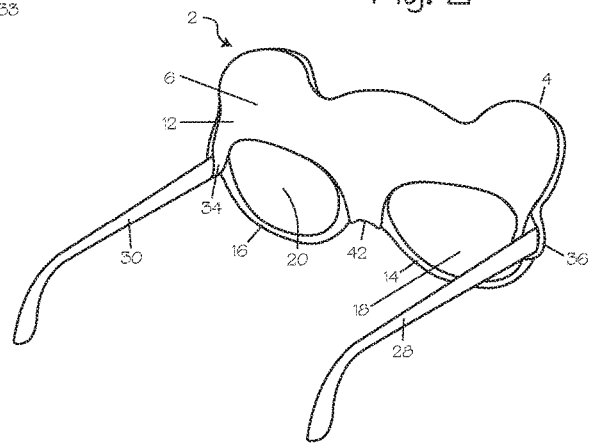
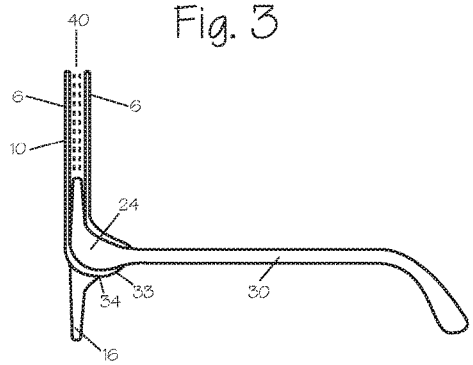
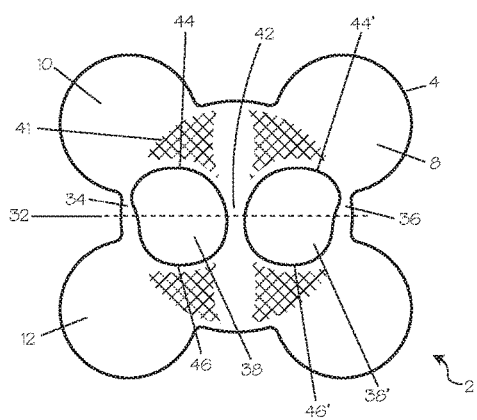

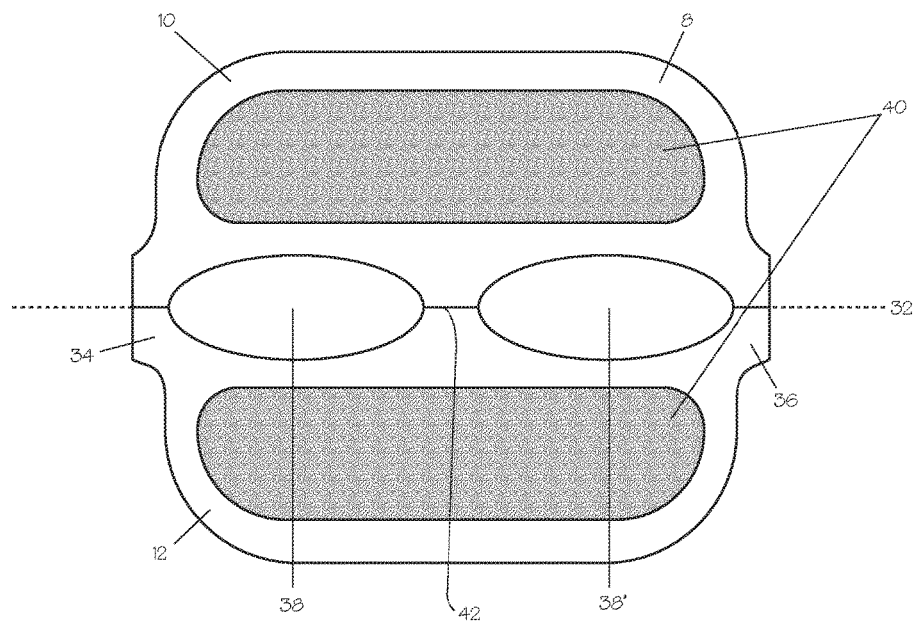

ACCESSORY FOR EYEWEAR

BACKGROUND OF THE INVENTION

The present invention relates generally to accessories for eyewear such as eyeglasses, sunglasses, or goggles, which provide the ability to add cosmetic and/or functional designs and attachments, such as decorations or wearable technology.

BRIEF DESCRIPTION OF THE PRIOR ART

Anyone with toddlers and younger children is aware of the challenges that sometimes arise with encouraging reluctant children to wear specific articles of clothing. Some children (and adults) have strong opinions when it comes to fabric texture (too itchy), or the cut of a particular article (too tight). One method of fostering independence and encouraging children to wear a particular article is to add specific aesthetic elements. These methods can include specific colors or motifs, such as favorite book or movie characters, or other decorative elements.

A problem arises, however, with eyewear. Most eyewear includes functional elements, such as bendable frames, spring loaded temples, scratch resistant lenses and the like. Aesthetic features are typically limited to the geometry or color of the eyewear frame. Comfort features are typically limited to small adhesive pads applied to the bridge portion of the eyewear frame. These pads can elevate the eyewear bridge portion so that it is not in direct contact with a wearer's nose and help alleviate pinching or improve the fit by reducing slipping. Over time these pads may become soiled leading to dermatologic conditions or may become dislodged requiring replacement.

There exist eyewear accessories that attach to frames with clips, snaps and/or straps; provide cushioning elements; and provide anti-slip devices, but none of these address the "costuming" technique of encouraging children to wear eyewear.

Costumes including masks, whether worn by children or adults, are either not intended to be worn with eyewear or do not comfortably attach to the eyewear or conform to the face. Such masks utilize a strap or an elastic cord attached at the sides of the mask which is intended to wrap around the back of the head of a wearer. Masks, whether worn under or over eyewear, tend to obstruct the vision and breathing of the wearer. When worn over the eyewear, the strap or elastic cord is stretched to its maximum and tends to push the eyewear high on the bridge of the wearer's nose causing pinching, excessive pressure against the nose and forehead of the wearer and general discomfort. During physical activity, masks may become displaced (potentially resulting in injury), become damaged, or lead to excessive perspiration.

Other masks utilize metal or plastic clips to attach the mask to the eyewear. Clip-on mechanisms have a tendency to scratch lenses. Other masks utilize complementary hook and loop fastening systems. With such systems, however, one portion of the complementary hook and loop fastening system is adhesively applied to the eyewear frame. If the mask is subsequently removed from the eyewear, the portion of the fastening system attached to the eyewear can become a source of irritant to the skin and the eyewear can no longer be comfortably worn without the mask.

Existing eyewear accessories may use tube shaped straps to secure the accessory to the eyewear. For example, the Burns U.S. Pat. No. 4,606,453 discloses a visor which in use requires eyewear temple portions pass through tube shaped structures. The Beliveau U.S. Pat. No. 8,387,163 discloses a mask, which in use requires eyewear temple portions to pass through slots in the mask. Each of these accessories requires fine motor skills and dexterity often lacking in toddlers and younger children.

SUMMARY OF THE INVENTION

In accordance with embodiments of the invention, a wearer can modify eyewear with a removable accessory that not only has functional, but also entertainment and novelty value by allowing a user to apply decorative design elements for a customized appearance.

More specifically, embodiments of the present invention provide for an eyewear accessory made of a flexible material which when folded and removably attached to itself secures the accessory snugly around the eyewear frame, wrapping under the bridge section and both temples. The material that sits above the frames can be used for decorative embellishments which can be permanently attached to the accessory or detachable. The accessory may be flat or three dimensional.

Embodiments of the invention can be quickly installed by toddlers, young children or adults and allow the user to attach embellishments to eyewear without the use of clips or having to alter the eyewear in any way. Embodiments of invention also improve the comfort to the wearer, whether worn by children or adults, by adding a cushioning layer between the eyewear frame and the wearer at touch-points on the bridge and temples.

Embodiments of the invention do not contemplate alteration to the eyewear. All aspects of the accessory for eyewear contemplated herein, once removed from the eyewear, leave the eyewear as originally presented. No portion of the accessory device and no portion of the attachment mechanism is left behind after the accessory is removed.

BRIEF DESCRIPTION OF THE FIGURES

Other objects, features and advantages of the present invention will become apparent upon reading the following description taken in conjunction with the accompanying drawings, in which:

FIG. 1 is front perspective view of the accessory mounted on an article of eyewear according to an embodiment of the invention;

FIG. 2 is a rear perspective view of the embodiment of FIG. 1;

FIG. 3 is a side view of the embodiment of FIG. 1;

FIG. 4 is an elevation view of the accessory of the embodiment of FIG. 1 in an open condition;

FIG. 5 is an elevation view of an alternative embodiment of the accessory in an open condition;

DETAILED DESCRIPTION OF THE INVENTION

Figure 6:
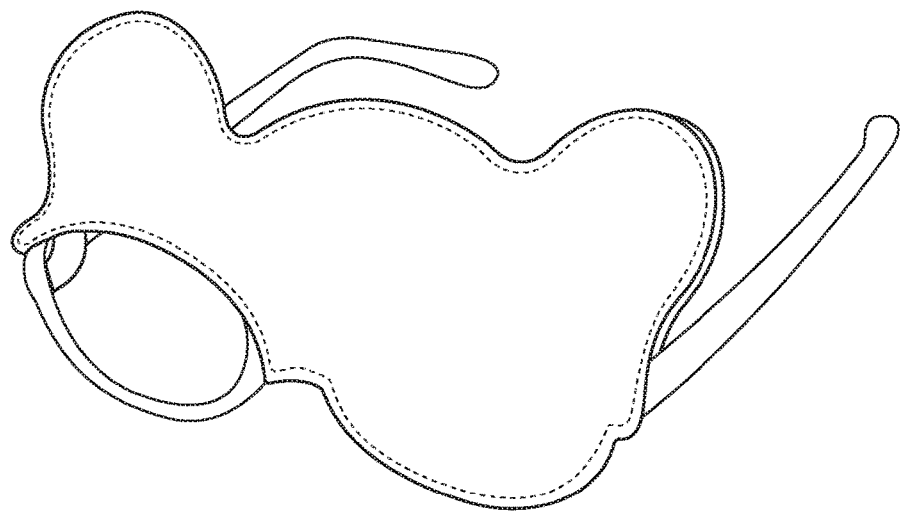
FIG. 6 is an elevation view of an alternative embodiment of the accessory mounted on an article of eyewear according to the invention.
Figure 7:
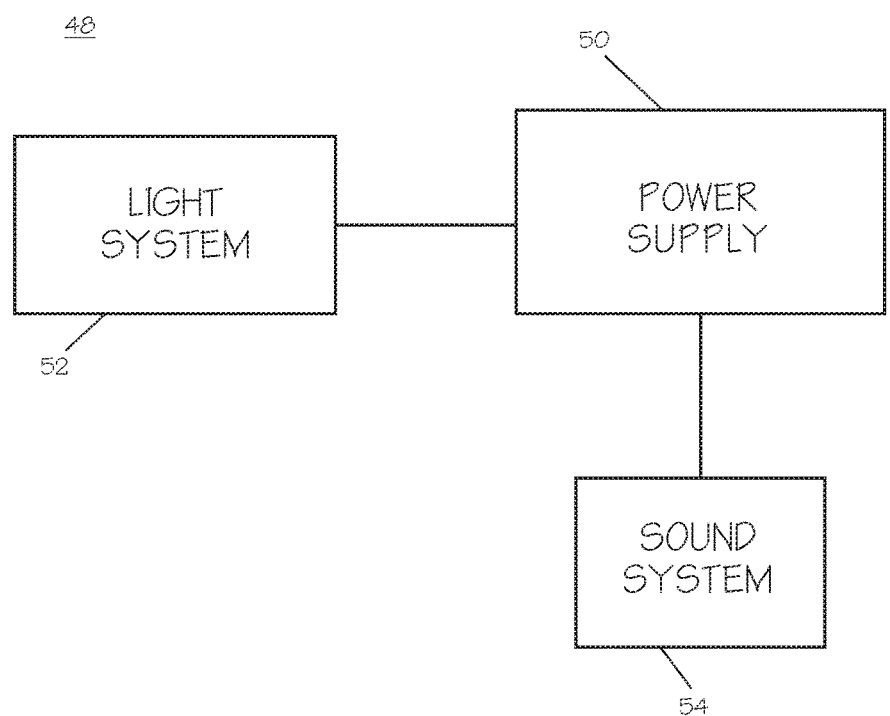
FIG. 7 is a schematic illustration of an electrical system for powering lights and sound according to an embodiment of the invention.

The accessory for eyewear may be employed with a variety of shapes and sizes of eyewear, the eyewear having at least one lens and a frame encasing the lens. The temples, as referred to herein, include entire parts of the eyewear piece attached to the frame extending along the side of the wearer's head and behind the ear. Eyewear as referred to herein, includes eyeglasses, sunglasses, ophthalmic prescription eyeglasses, goggles, safety eyeglasses, spectacles, and the like having one or more lenses through which the wearer's eye can see.

Referring to FIG. 1, eyewear 11 has a frame with a first portion 14 and a second portion 16 which hold a first lens 18 and a second lens 20, respectively. The first portion 14 and the second portion 16 are joined together and separated a distance from each other by a bridge which is formed to rest upon a top portion of a wearer's nose. Nose portions extend down from the bridge in spaced relation between the bridge and the frame encasing the lenses. The nose portions are either integral with the frame or are applied to the frame.

Referring to FIG. 3, extending outwardly from eyewear 11 frame first portion 14 is a first side portion 24 and extending outwardly from the second portion 16 is a second side portion 26. A first temple 28 is pivotally connected to the first side portion 24 and a second temple 30 is pivotally connected to the second side portion 26.

Referring to FIGS. 1-4, the accessory 2 for eyewear includes a sheet 4 of lightweight, flexible, durable, soft material. In accordance with embodiments of the invention, the sheet may be of any geometric or irregular shape. The sheet may be symmetrical, partially symmetrical, asymmetrical or partially asymmetrical in any direction.

The sheet 4 may be constructed of fabric including natural or synthetic fibers including wool, cotton, felt, linen, synthetic rubber, synthetic leather, nylon, rayon, fabric-covered rubber, neoprene, fabric-covered neoprene, animal hide, including leather, shammy, ridged, semi-ridged or flexible plastic or other suitable material. The sheet 4 may be constructed of moisture absorbing materials. In alternative embodiments where durability is not a consideration, the sheet 4 may be constructed from paper, cardstock, cardboard, Mylar, plastic sheeting material or other suitable materials.

The sheet 4 may be a single layer of material or may be a laminate material. The laminate may be a multi-layered sheet with an exterior or outer facing surface 6, middle layer and an interior facing surface 8. The laminate material may extend through all or a portion of the sheet 4. The exterior 6 may include decorative embellishments, film or book character likenesses, indicia such as logos, mascots, numbers, or symbols, lights, speakers etc. The decorative embellishments may be permanently affixed to the exterior 6 or may be removable and exchanged for other embellishments. The decorative embellishments may be embossed, appliquéd, embroidered, sewn, printed, glued, heat bonded, adhered or otherwise applied to the exterior layer, and may be two-dimensional or three-dimensional.

The sheet 4 is sized and shaped to extend over at least a major portion of the distance between eyewear 11 side portions 24, 26. In some embodiments, sheet 4 be will wider than the distance between side portions 24, 26. The sheet 4 includes a first front portion 10 and a second rear portion 12, a first side portion 34 and a second side portion 36. In alternate embodiments, the sheet also includes a middle portion discussed in further detail in the succeeding paragraphs.

In spaced relation between the first portion and the second portion, a longitudinal axis 32 defines a fold line.

The sheet 4 includes at least one aperture positioned in spaced relation between the first 10 and second 12 portions and the first side portion 34 and second side portion 36 and intersecting the longitudinal axis 32. In accordance with embodiments of the invention, a first aperture 38 and a second aperture 38' are provided, with each aperture intersecting the longitudinal axis and along the same plane. Each of apertures 38, 38' is placed in space relation between the first and second portions 10, 12 and in spaced relation between first and second side portions 34, 36. In some embodiments, the distance between first aperture 38 and the first side portion 34 and the distance between second aperture 38' and the second side portion 36 are substantially equal. The portion of sheet 4 defined by the distance between the first aperture 38 and the first side portion 34 and the second aperture 38' and the second side portion 36 define the portion of the sheet 4 that extends around eyewear 11 first and second side portions 24, 26 and temples 28, 30 and provides a cushion between the wearer and the eyewear 11 temples 28, 30.

The distance 42 between the first aperture 38 and second aperture 38' defines the portion of sheet 4 that substantially enfolds the bridge portion of eyewear 11. The distance 42 provides a cushion between the eyewear 11 bridge portion and a wearer's nose.

The interior facing surface 8 of sheet 4 includes a releasable complementary fastening system 41. The fastening system 41 may include hook and loop fasteners, snaps, buttons, magnets or other releasable, non-permanent fasteners. Releasable fastening system refers to those fastening devices which fix the fastened portions of the sheet so that unfastening of such portions requires no material alteration to the sheet. The fastening system 41 may be applied to the interior surface 8 by adhesive, glue, heat bonding techniques, embossing, sewn or otherwise applied or mounted on sheet 4. The fastening system 41 is positioned on interior surface 8 in spaced relation within the first portion 10 and adjacent to aperture 38, 38'. A complementary portion of fastening system 41 is also positioned on interior surface 8 in spaced relation with the second portion 12 and adjacent to a perimeter of aperture 38, 38'. Alternatively, the fastening system 41 may extend through all or only a portion of first and second portions 10, 12. Still further, placement of the fastening system 41 may be intermittent. Regardless of placement within the first and second portions 10, 12, fastening system 41 complementary portions are in alignment. In alternative embodiments, fastening system 41 may be placed around a perimeter of the apertures 38, 38'.

In use, the sheet 4 is placed on a surface with the interior surface 8 facing towards the user. Eyewear 11 is placed along the longitudinal axis 32 with the first and second side portions 34, 36 substantially aligning with eyewear 11 first and second side portions 24, 26. The sheet 4 is then folded along the longitudinal axis 32 with the frame portions 14, 16 and lenses 18, 20 passing through the apertures 38, 38'. The complementary fasteners 41 along the interior facing surface 8 are aligned and secured. The eyewear 11 is now secured within the fold 33' of accessory 2 with the fold 33' resting against bridge and wrapping around eyewear 11 side portions 24, 26 and temples 28 and 30.

In embodiments with a single aperture (not shown), eyewear is placed along the longitudinal axis with the first and second side portions substantially aligning with the first and second side portions of the eyewear. The sheet is then folded along the longitudinal axis with the frame portions and lens portion passing through the aperture. The complementary fasteners along the interior facing surface are aligned and secured. The eyewear is now secured within the fold of the accessory with the fold wrapping around side portions and temples.

In accordance with embodiments of the invention, the lenses 18, 20 are not obstructed by the accessory 2. In other embodiments, at least a portion of the lens may be obstructed, such as in those instances where placement of a patch or other medical device is necessary to address ophthalmic conditions such as Amblyopia. In such instances, the accessory may incorporate the patch element.

In accordance with embodiments of the invention, the first and second portions 10, 12 extend over a top portion of eyewear frame portions 14, 16 and provide a cushion between a top portion of the eyewear frame 14, 16 and the wearer. In embodiments of the invention, the first portion 10 and the second portion 12 of sheet 4 are constructed of the same material. In other embodiments, first portion 10 and second portion 12 are constructed from different materials. In some embodiments, one or both of the first portion 10 and second portion 12 may be constructed from moisture absorbing materials.

Figure 8:
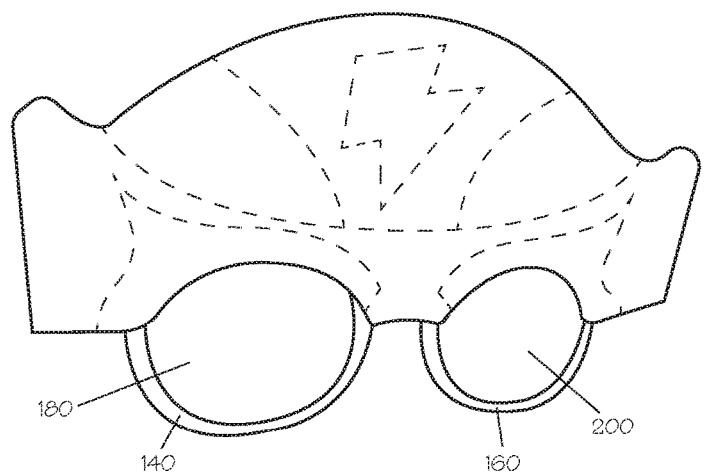
FIG. 8 is front perspective view of an alternative embodiment of an accessory mounted on an article of for eyewear according to the invention.
Figure 9:
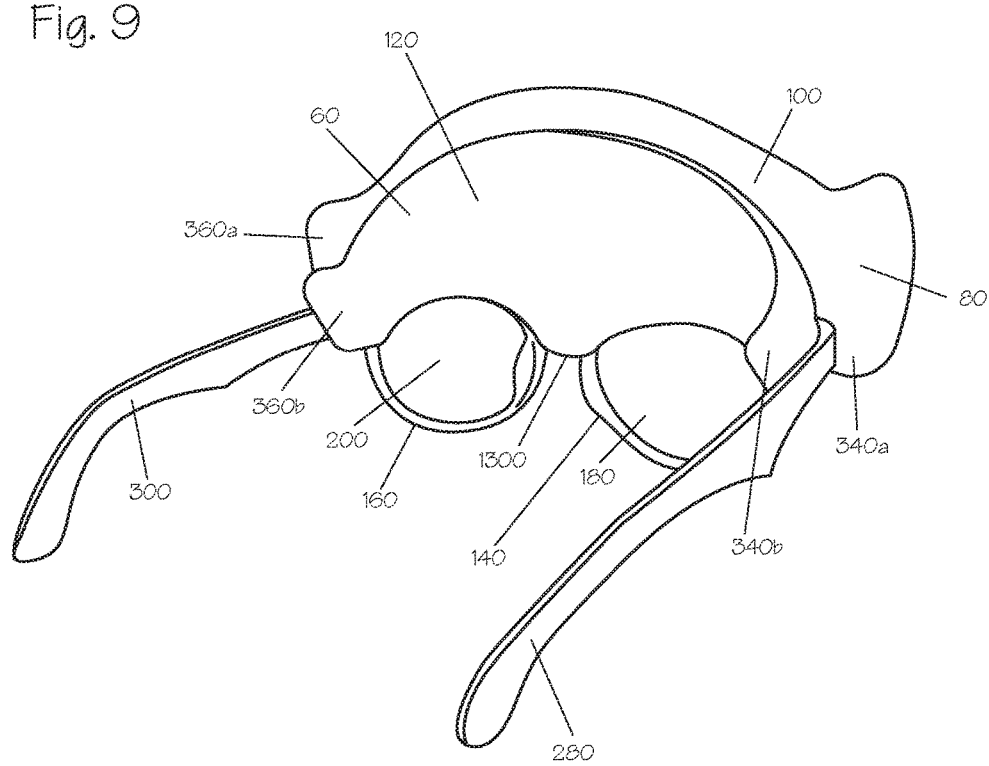
FIG. 9 is a rear perspective view of the embodiment of FIG. 8.
Figure 10:
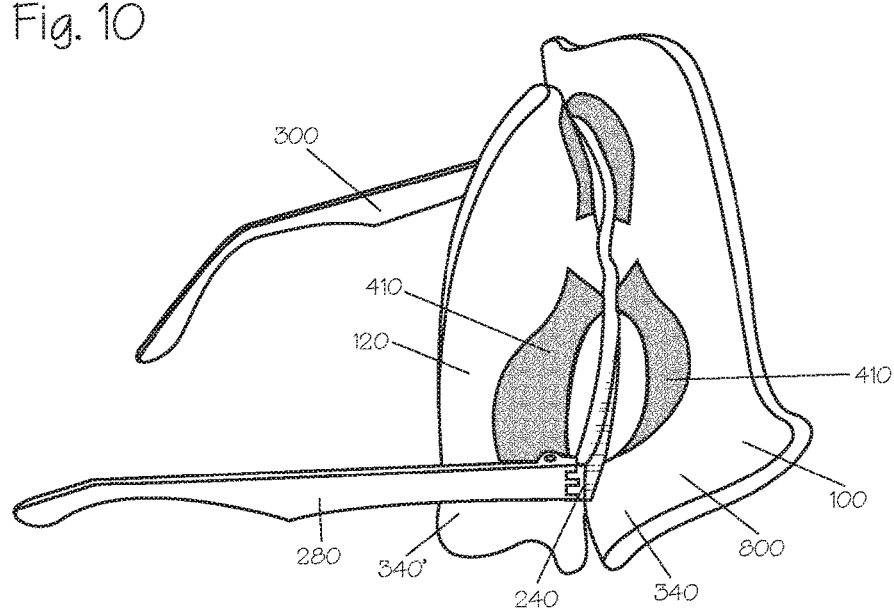
FIG. 10 is a side view of the embodiment of FIG. 8 in a partially open condition.
Figure 11:
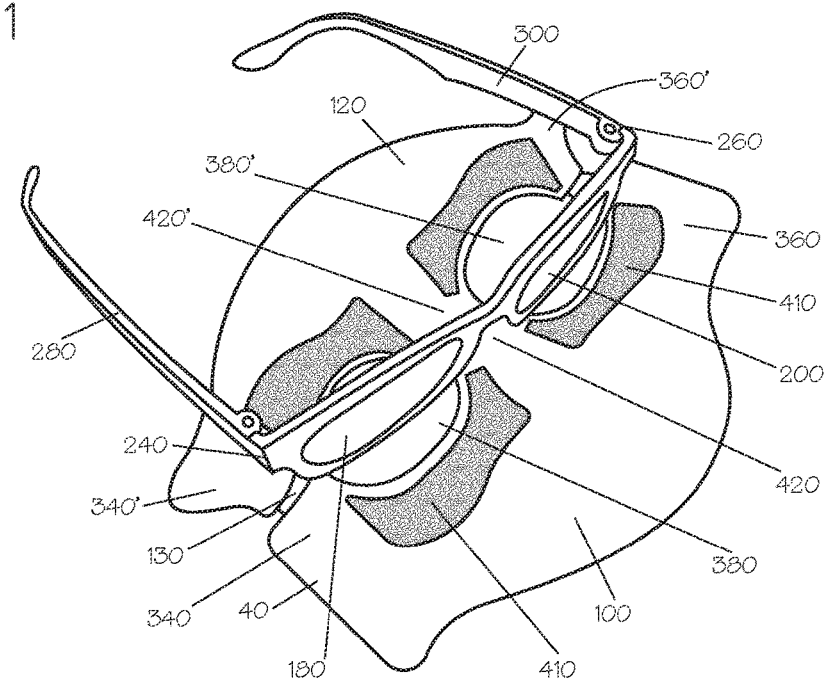
FIG. 11 and 12 are elevation views of the embodiment of FIG. 8 in an open condition.
Figure 12:
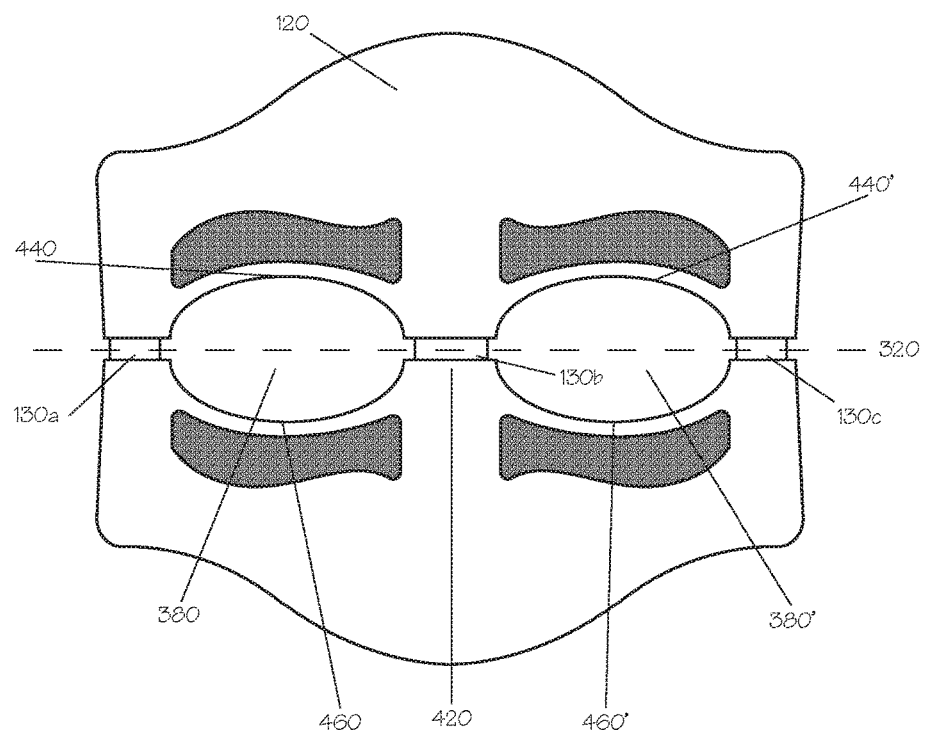
Figure 13:
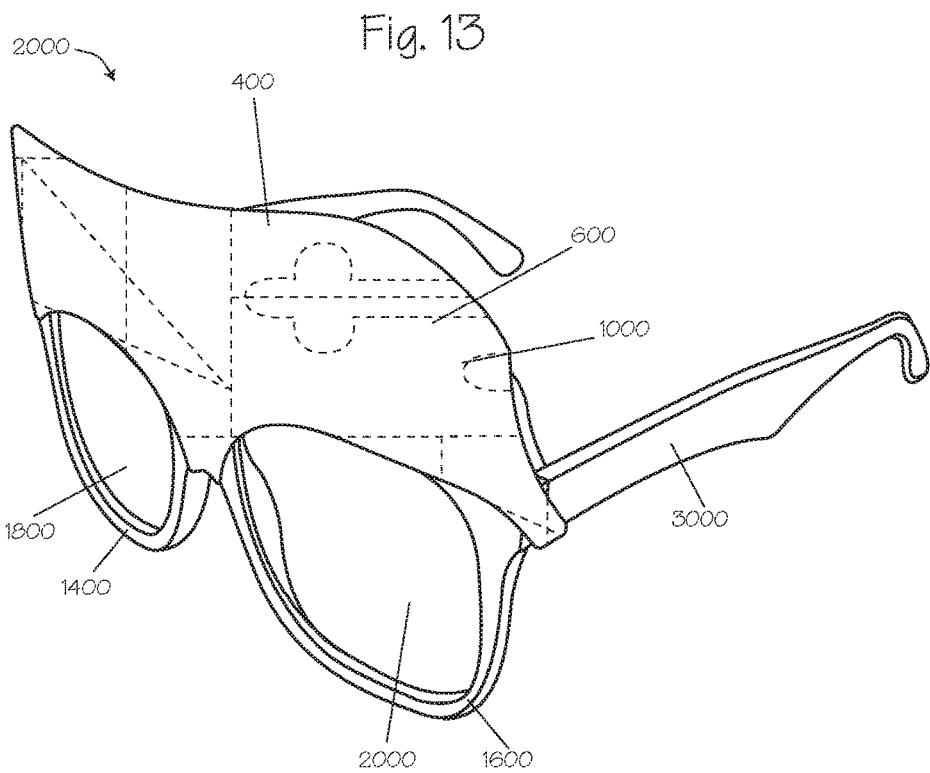
FIG. 13 is a side perspective view of a further embodiment of an accessory mounted on an article of eyewear according to the invention.
Figure 14:
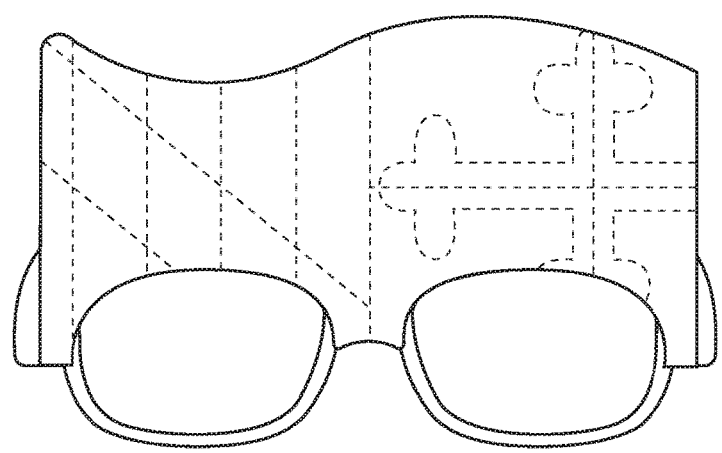
FIG. 14 is a front elevation view of the embodiment of FIG. 13.
Figure 15:
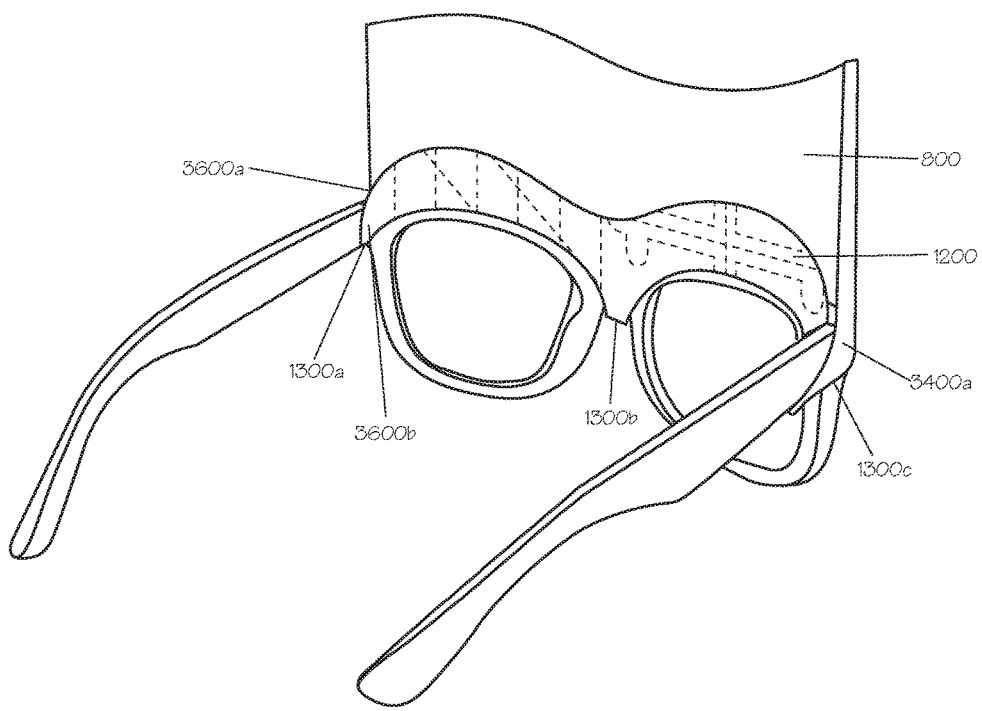
FIG. 15 is a rear elevation view of the embodiment of FIG. 13.
Figure 16:
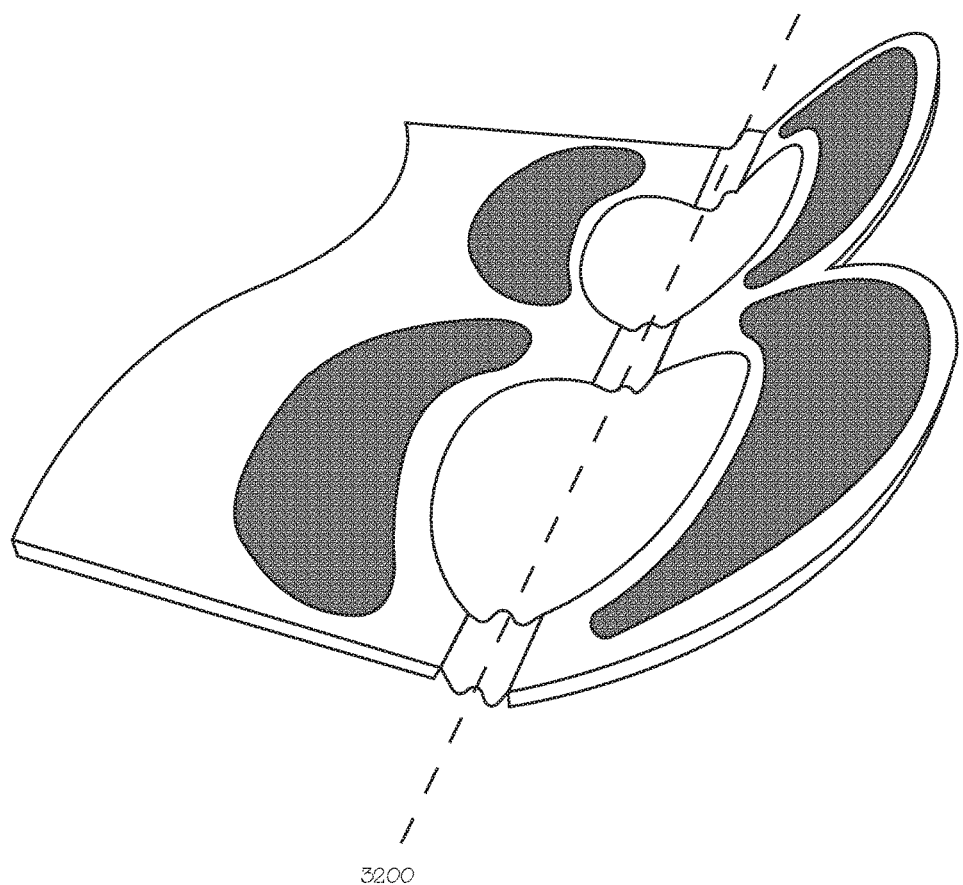
FIGS. 16 and 17 are elevation views of the embodiment of FIG. 13 in an open condition.
Figure 17:
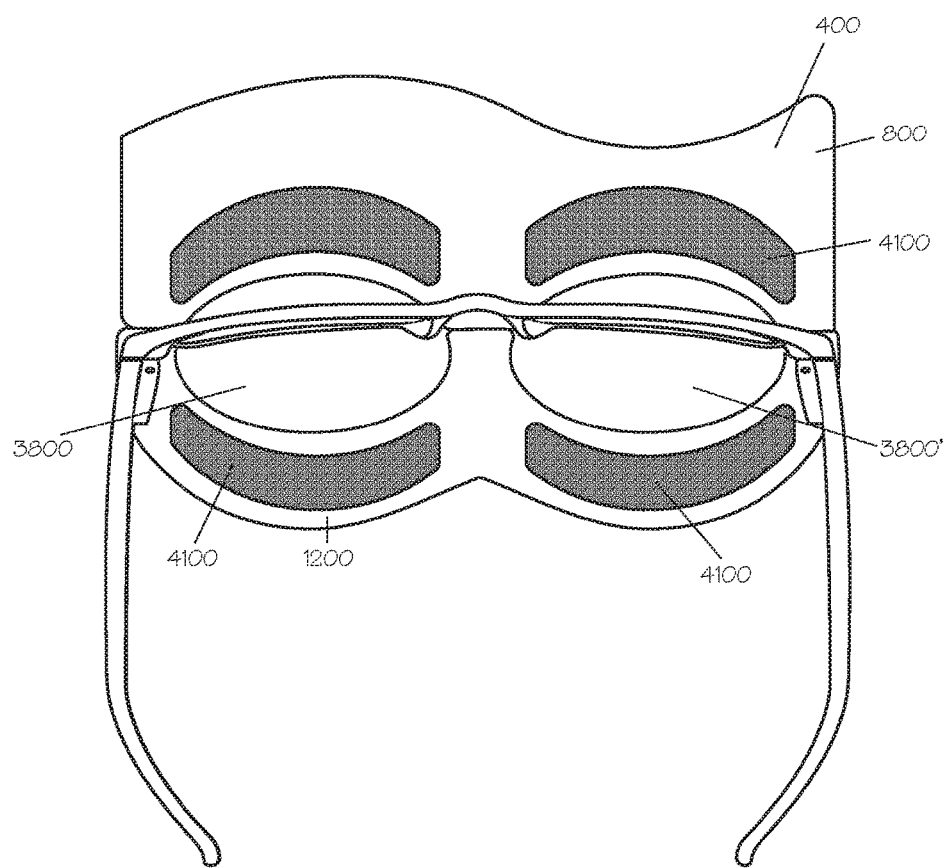
Figure 18:
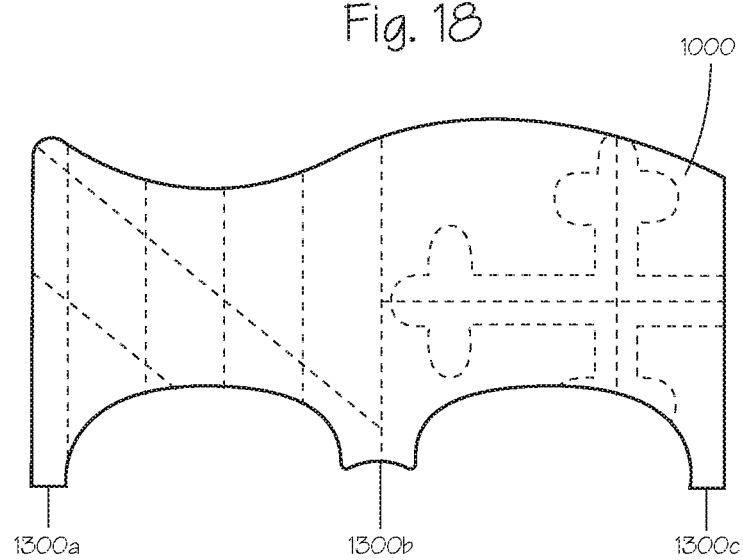
FIG. 18 is a front elevation view of the embodiment of FIG. 13 in a closed condition.
Figure 19:
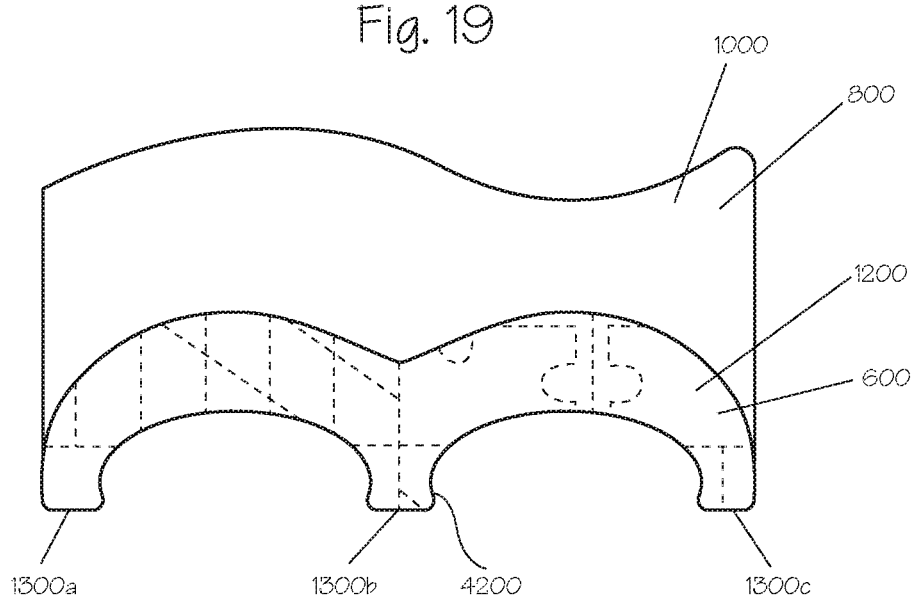
FIG. 19 is a rear elevation view of the embodiment of FIG. 13 in a closed condition.
Figure 20:
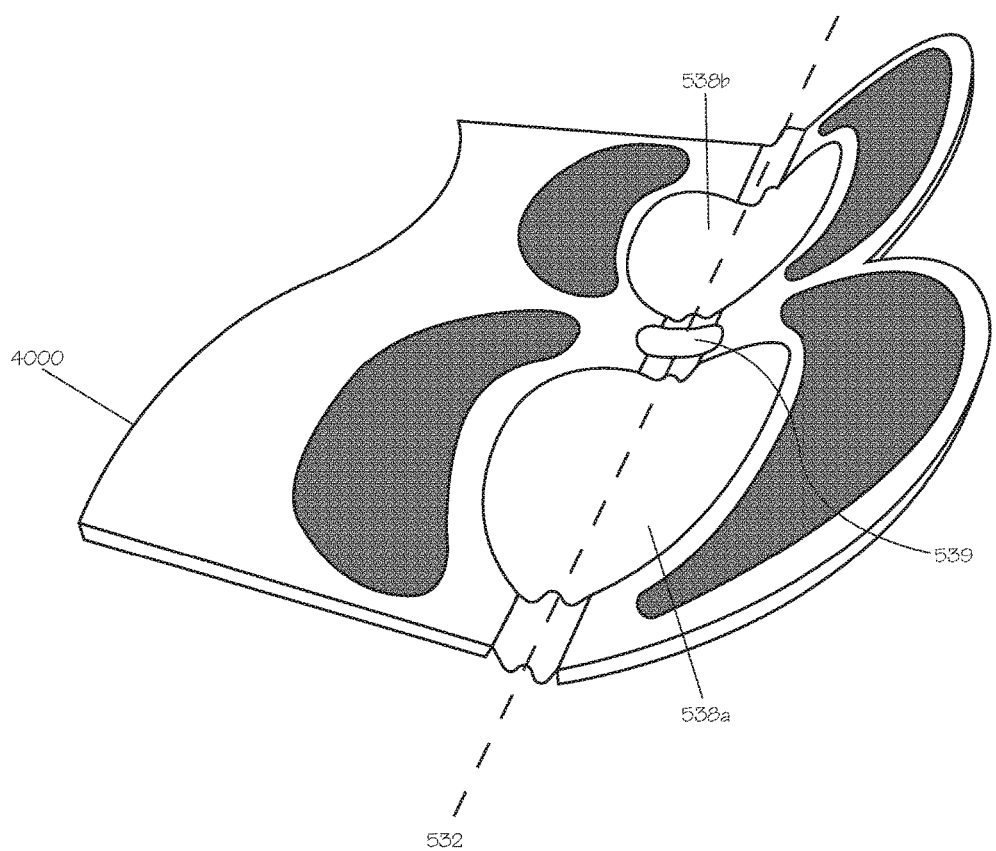
FIGS. 20 and 21 are elevation views of a further embodiment of an accessory in an open condition.
Figure 21:
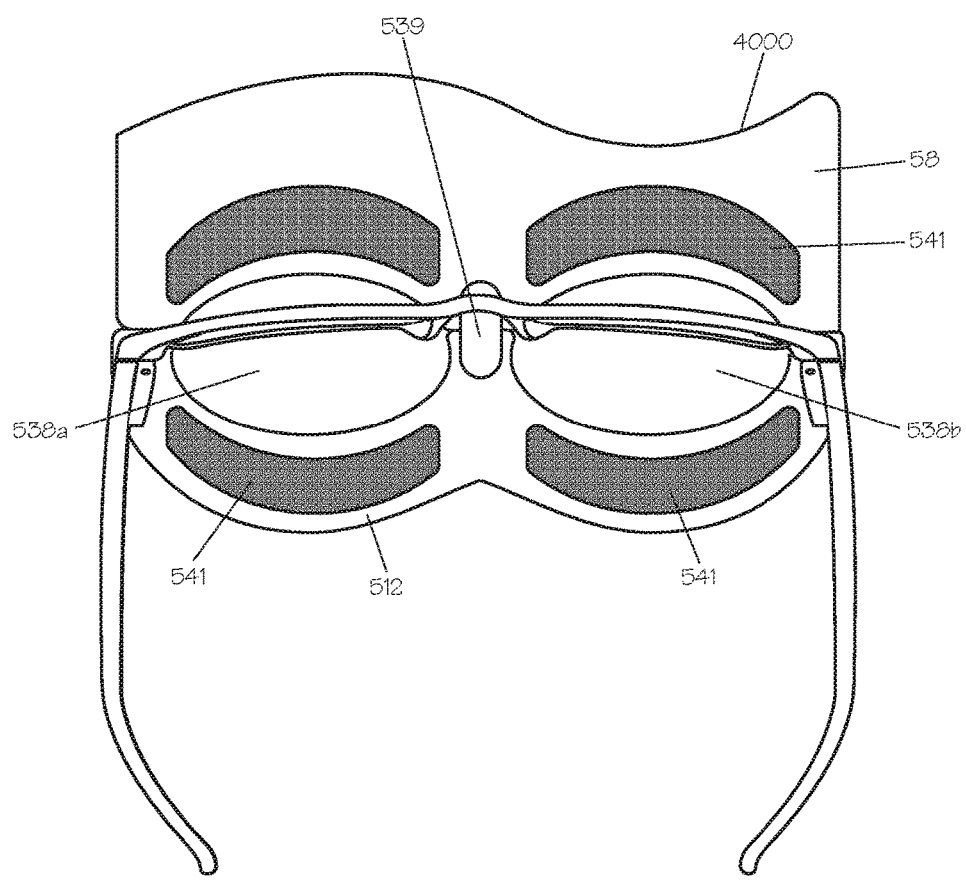
Figure 22:
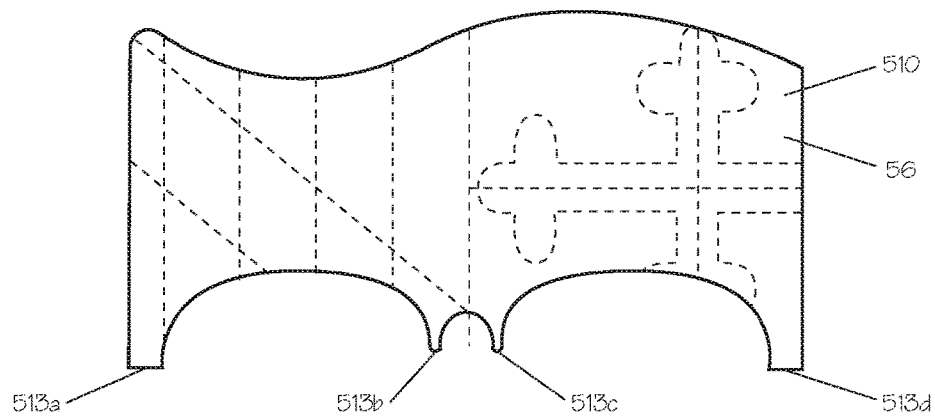
FIG. 22 is a front elevation view the embodiment of FIG. 20 in a closed condition.
Figure 23:
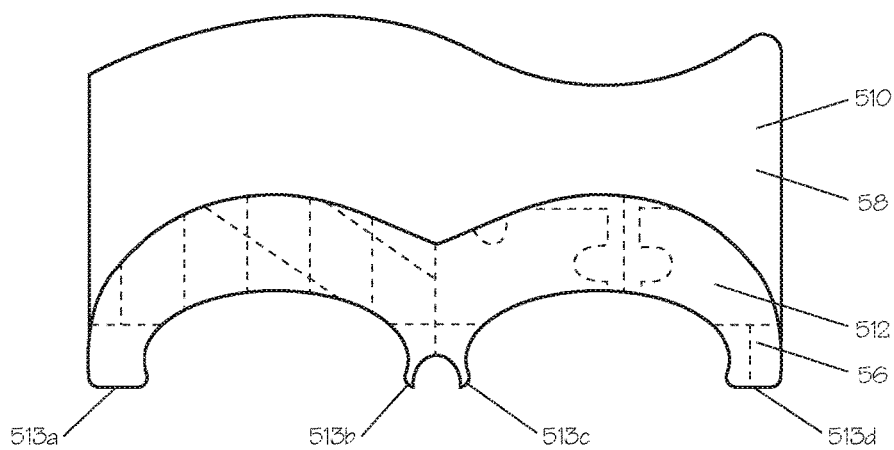
FIG. 23 is a rear elevation view of the embodiment of FIG. 20 in a closed condition.

The laminate may include a middle layer including interfacing, batting, foam, or cushioning material and the like or may include a further layer of the exterior and/or interior sheeting material. In alternative embodiments, as shown in FIG. 8, the middle layer may include electrical components 48 for displaying light 52 and sound 54, as wells as the requisite powers supplies 50 for the electrical systems.

Referring to the embodiment of FIGS. 8-12, sheet 40 includes a first portion 100, and a second portion 120. The sheet 40 is sized and shaped to extend over at least a major portion of the distance between eyewear frame portions 140, 160 and side portions 240, 260. The sheet 40 includes a first portion 100 and a second portion 120, a first side portion 340a, 340b and a second side portion 360a, 360b. Sheet 40 can include similar elements with similar features as sheet 4. For example first portion 100 can be similar to first portion 10 and second portion 120 can be similar to second portion 12.

Sheet 40 further includes a mid-sheet portion 130 positioned between first sheet portion 100 and second sheet portion 120. Mid-sheet portion 130 may be constructed similarly to the first and second sheet portions 100, 120. Mid-sheet portion 130 may be an extension of the first portion 100 and second portion 120, an extension of the first or second portion 100, 120 only, or may be a separate material in its entirety. In alternate embodiments, mid-sheet portion 130 has elastic properties. Mid-sheet portion 130 may include elastic threads, ribbons, tapes, bands, cords or other webbed, woven and non-woven fabrics or materials with elastomeric properties.

In spaced relation between the first portion and the second portion a longitudinal axis 320 defines a fold line. Mid-sheet portion 130 defines the placement of the longitudinal axis 320.

The sheet 40 includes at least one aperture positioned in spaced relation between the first 100 and second 120 portions and the first side portion 340a, 340b and second side portion 360a, 360b and intersecting the longitudinal axis 320. In accordance with embodiments of the invention, a first aperture 380 and a second aperture 380' are provided with each aperture intersecting the longitudinal axis 320 and extending within the same plane. Each of apertures 380, 380' is placed in spaced relation between the first and second portions 100, 120 and within spaced relation between first and second side portions 340a, 340b, 360a, 360b. The distance between first aperture 380 and the first side portion 340b and the second aperture 380' and the second side portion 360b is substantially equal. The portion of sheet 40 defined by the distance between the first aperture 380 and the first side portion 340b and the second aperture 380' and the second side portion 360b define the portion of sheet 40 that extends around an inside surface of eyewear 110 first and second side portions 240, 260 and an inside surface of temples 280, 300.

In accordance with embodiments of the invention, the distance between first aperture 380 and first side portion 340a and second aperture 380' and the second side portion 360a is substantially equal. In embodiments where the sheet 40 is asymmetrical or irregularly shaped, the distance between first aperture 380 and first side portion 340a and second aperture 380' and the second side portion 360a may not be equal. In fact, as these portions extend along the exterior facing surface of the accessory, the need for side portions 340a, 360a to be substantially equal, or even equal is unnecessary. Still further, side portions 340a, 340b may be substantially the same shape and size and side portions 360a, 360b may be substantially the same size. In other embodiments, side portions 340a, 340b and 360a, 360b may have different sizes and shapes. In other embodiments side portions 340a, 360a may extend beyond a perimeter of the eyewear 11, but do not wrap around an outside surface of side portions 240, 260 but rather extend beyond the eyewear. Side portions 340a, 360a may have the same size and shape, while in other embodiments, side portions 340a, 360a may have different sizes and shapes.

The distance 424 between the first aperture 380 and second aperture 380' defines the portion of sheet 40 that substantially enfolds the bridge portion of eyewear 110.

The interior facing surface 800 of sheet 40 includes a releasable complementary fastening system 410 similar in construction and placement to fastening system 41.

In use, the sheet 40 is placed on a surface with the interior surface 800 facing toward from the user. Eyewear 110 is placed along the longitudinal axis 320 with mid-sheet portion 130a, 130c substantially aligning with the first and second side portions 240, 260, of eyewear 110. Sheet 40 is then folded along the longitudinal axis 320 with the frame portions 141, 160 and lenses 180, 200 passing through aperture 380, 380'. The complementary fasteners 410 along the interior facing surface 800 are aligned and secured. Eyewear 110 is now secured within the fold 330' of accessory 200 with the fold 330' and mid-sheet portion 130b resting against the eyewear bridge and mid-sheet portion 130a, 130c and first and second side portions 340b, 360b wrapping around an inside surface of side portions 240, 260 and an inside surface of temples 280 and 300.

In accordance with embodiments of the invention, lenses 180, 200 are not obstructed by the accessory 200. In other embodiments, at least a portion of a lens may be obstructed such as in those instances where placement of a patch or other medical device is necessary to address ophthalmic conditions.

In accordance with embodiments of the invention, the first and second portions 100, 120 extend over a top portion of eyewear frame portion 140, 160 and provide a cushion between a top portion of the eyewear frame 140, 160 and the wearer. In embodiments of the invention, the first portion 100 and the second portion 120 of sheet 40 are constructed of the same material. In other embodiments, first portion 100 and second portion 120 are constructed from different materials. In some embodiments, second portion 120 may be constructed from moisture absorbing materials.

In accordance with embodiments of the invention, mid-sheet portion 130 is stretched to expand the size of aperture 380, 380', thus allowing sheet 40 to fit a range of eyewear 110 sizes and shapes.

Referring to the embodiment of FIGS. 13-19, sheet 400 includes a first portion 1000, a second portion 1200. The sheet 400 is sized and shaped to extend over at least a major portion of the distance between of eyewear 1100 frame 1400, 1600 and side portions 2400, 2600. The sheet 400 includes a first portion 1000 and a second portion 1200, a first side portion 3400a, 3400b and a second side portion 3600a, 3600b. Sheet 400 can include similar elements with similar features as sheets 4 and 40. For example first portion 1000 can be similar to first portion 10 or 100, second portion 1200 can be similar to second portion 12 or 120 and mid-sheet portion 1300 can be similar to mid-sheet portion 130.

First sheet portion 1000 and second sheet portion may be constructed of the same materials or different materials. First sheet portion 1000 may be a single material or a laminate material. Similarly, second sheet portion 1200 may be a single material or a laminate material.

Sheet 400 further includes a mid-sheet portion 1300 positioned between first sheet portion 1000 and second sheet portion 1200. Mid-sheet portion 1300 may be constructed similarly to the first and second sheet portions 1000, 1200. Mid-sheet portion 1300 may be an extension of the first portion 1000 and second portion 1200, an extension of the first or second portion 1000, 1200 only, or may be a separate material in its entirety. In alternate embodiments, mid-sheet portion 1300 has elastic properties.

In spaced relation between the first portion and the second portion a longitudinal axis 3200 defines a fold line. Mid-sheet portion 1300 defines the placement of the longitudinal axis.

The sheet 400 includes a first aperture 3800 and a second aperture 3800' with each aperture intersecting the longitudinal axis and extending within the same plane. Each of apertures 3800, 3800' is placed in spaced relation between the first and second portions 1000, 1200 and within spaced relation between first and second side portions 3400a, 3400b, 3600a, 3600b. The distance between first aperture 3800 and the first side portion 3400b and the second aperture 3800' and the second side portion 3600b is substantially equal. The portion of sheet 400 defined by the distance between the first aperture 3800 and the first side portion 3400b and the second aperture 3800' and the second side portion 3600b define the portion of sheet 40 that extends around an inside surface of eyewear 1100 first and second side portions 2400, 2600 and an inside surface of temples 2800, 3000.

In accordance with embodiments of the invention, the distance between first aperture 3800 and first side portion 3400a and second aperture 3800' and the second side portion 3600a is substantially equal. In embodiments where the sheet 400 is asymmetrical or irregularly shaped, the distance between first aperture 3800 and first side portion 3400a and second aperture 3800' and the second side portion 3600a may not be equal. In fact, as these portions extend along the exterior facing surface of the accessory, the need for side portions 3400a, 3600a to be equal is unnecessary. Still further, side portions 3400a, 3400b may be substantially the same shape and size and side portions 3600a, 3600b may be substantially the same size. In other embodiments, side portions 3400a, 3400b and 3600a, 3600b may have different sizes and shapes. In other embodiments side portions 3400a, 3600a may extend beyond a perimeter of the eyewear 1100, but do not wrap around an outside surface of side portions 2400, 2600. Side portions 3400a, 3600a may have the same size and shape, while in other embodiments, side portions 3400a, 3600a may have different sizes and shapes.

The distance 4200 between the first aperture 3800 and second aperture 3800' defines the portion of sheet 400 that substantially enfolds the bridge portion of eyewear 1100.

The interior facing surface 800 of sheet 400 includes a releasable complementary fastening system 4100 similar in construction and placement to fastening system 41, 410.

Use and placement of eyewear 11 within accessory 2000 is similar to use and placement within accessory 200.

In accordance with embodiments of the invention, the first and second portions 1000, 1200 extend over the top portion of the eyewear 1100. In embodiments of the invention, the first portion 1000 and the second portion 1200 of sheet 400 are constructed of the same material. In other embodiments, first portion 1000 and second portion 1200 are constructed from different materials. In some embodiments, second portion 1200 may be constructed from moisture absorbing materials.

In accordance with embodiments of the invention, mid-sheet portion 1300 is stretched to expand the size of aperture 3800, 3800', thus allowing sheet 400 to fit a range of eyewear 1100 sizes and shapes.

As show in FIGS. 13-19, the size and geometry of the first portion 1000 and second portion 1200 are different. Still further, the geometry of first portion 1000 is irregular. It is contemplated that the size and geometry of first portion 1000 will accommodate variations in decorative embellishments, character likenesses or other indicia.

Referring to the embodiment of FIGS. 20-23, sheet 4000 can include similar elements with similar features, materials and construction as sheets 4, 40 and 400.

In spaced relation between the first portion and the second portion a longitudinal axis 532 defines a fold line. A mid-sheet portion 513a, 513b, 513c, 513d defines the placement of the longitudinal axis.

The sheet 4000 includes a first aperture 538a and a second aperture 538b with each aperture intersecting the longitudinal axis and extending within the same plane. Each of apertures 538a, 538b is placed in spaced relation between the first and second portions 510, 512 and within spaced relation between first side portions 534a, 534b and second side portions 536a, 536b.

The distance 542 between the first aperture 538a and second aperture 538b defines the portion of sheet 4000 that substantially enfolds the bridge portion of eyewear.

To reduce excess bulk and quantity of sheet material used while still providing a cushioning effect, sheet 4000 further includes a third aperture 539 positioned in space relation between the first aperture 538a and second aperture 538b. When eyewear is enfolded within sheet 4000, the frame portion of the eyewear passes through apertures 538a and 538b and nose portions of the eyewear are cushioned by mid-sheet portions 513b and 513c, while a bridge portion of the eyewear is exposed by the third aperture 539.

It is contemplated that variations to the size and geometry of first portion 10, 100, 1000, 510 and second portion 12, 120, 1200 and 512 can be made to address comfort to the user but also reduce the quantity of sheet material necessary to practice the various embodiments.

While the present invention has been described with reference to one or more particular embodiments, those skilled in the art will recognize that many changes may be made thereto without departing from the spirit and scope of the present invention. Furthermore, components from one embodiment can be used in other non-exclusive embodiments. Each of these embodiments and obvious variations thereof is contemplated as falling within the spirit and scope of the invention.

What is claimed is:

1. An accessory for eyewear comprising:
   a sheet of lightweight, flexible material including an interior facing surface and an exterior facing surface, a first front portion, a second back portion, a first side portion and a second side portion;
   at least one aperture positioned in spaced relation between the first and second portions and the first and second side portions; and
   a releasable complementary fastening system, whereby when the sheet is folded an eyewear lens portion passes through the aperture and the eyewear is secured within the fold by the fastening system.

2. The accessory of claim 1, wherein the sheet comprises a laminate extending through at least a portion of the sheet.

3. The accessory of claim 2, and further comprising an electrical system extending through a portion of the laminate, the electrical system comprising at least one of a power supply, a light source and a sound source.

4. The accessory of claim 1, wherein the first portion comprises a first material and the second portion comprises a second material different from the first material.

5. The accessory of claim 1, wherein the sheet material has at least one of cushioning, shock absorbing and moisture absorbing properties.

6. The accessory of claim 1, wherein the eyewear lens portion is not obstructed by the sheet.

7. The accessory of claim 1, wherein the eyewear lens portion is obstructed by the sheet.

8. The accessory of claim 1, wherein at least one of the first and second portions extend over a top portion of the eyewear.

9. The accessory of claim 1, wherein a first aperture and a second aperture are provided, the apertures intersecting the sheet along a longitudinal axis and intersecting the sheet along the same plane.

10. The accessory of claim 9, wherein the first aperture is spaced from the second aperture to accommodate a bridge portion of the eyewear.

11. The accessory of claim 10, further comprising a third aperture, the third aperture in spaced relation between the first aperture and the second aperture, wherein during use the sheet rests against a nose portion of the eyewear and a bride portion of the eyewear is exposed by the third aperture.

12. The accessory of claim 1, wherein the fastening system is positioned on the interior facing surface.

13. The accessory of claim 12, wherein the fastening system is positioned adjacent to the aperture.

14. The accessory of claim 12, wherein the fastening system is positioned intermittently.

15. The accessory of claim 1, wherein the exterior surface of the first portion includes ornamentation.

16. The accessory of claim 15, wherein the ornamentation is at least one of removable, replaceable and interchangeable.

17. The accessory of claim 1, wherein the sheet further comprises a mid-sheet portion positioned in spaced relation between the first and second sheet portions.

18. The accessory of claim 17, wherein the mid-sheet portion contains a longitudinal axis.

19. The accessory of claim 17, wherein the mid-sheet portion is elastomeric.

20. The accessory of claim 1, wherein the sheet is partially symmetrical and partially asymmetrical.

* * * * *